(12) United States Patent
Lin

(10) Patent No.: US 6,819,056 B2
(45) Date of Patent: Nov. 16, 2004

(54) COLOR-CHANGING BULB OF INSTRUMENT PANEL OF A VEHICLE

(75) Inventor: Kuo-Fu Lin, Pingjen (TW)

(73) Assignee: Yeoujyi Electronics Co., Ltd., Taoyuan (TW)

( * ) Notice: Subject to any disclaimer, the term of this patent is extended or adjusted under 35 U.S.C. 154(b) by 0 days.

(21) Appl. No.: 10/413,293

(22) Filed: Apr. 15, 2003

(65) Prior Publication Data

US 2004/0207334 A1 Oct. 21, 2004

(51) Int. Cl.[7] .......................... H05B 37/00; F21V 33/00
(52) U.S. Cl. ............................... 315/185 S; 315/200 A; 315/312; 315/58; 362/806; 362/808; 362/800
(58) Field of Search ...................... 315/185 S, 200 A, 315/312, 324, 56–58, 77, 82, 185 R, 360; 362/806, 808, 800, 812, 363, 372, 807, 377, 378, 362

(56) References Cited

U.S. PATENT DOCUMENTS

| | | | | |
|---|---|---|---|---|
| 5,151,679 A | * | 9/1992 | Dimmick | 340/326 |
| 5,420,482 A | * | 5/1995 | Phares | 315/292 |
| 5,697,695 A | * | 12/1997 | Lin et al. | 362/184 |
| 6,072,280 A | * | 6/2000 | Allen | 315/185 S |
| 6,441,558 B1 | * | 8/2002 | Muthu et al. | 315/149 |
| 6,550,953 B1 | * | 4/2003 | Ichikawa et al. | 315/56 |
| 6,621,222 B1 | * | 9/2003 | Hong | 315/51 |

* cited by examiner

Primary Examiner—Tuyet Thi Vo
(74) Attorney, Agent, or Firm—Rosenberg, Klein & Lee

(57) ABSTRACT

A color-changing bulb for an instrument panel of a vehicle, which is made as a bulb and directly installable in a bulb seat of the instrument panel is provided. The color-changing bulb includes a bulb housing defining a receiving space for receiving a light emitting diode and a circuit board. The light emitting diode includes three-color LED chips for generating red, green and blue light components. A controlling circuit is disposed on the circuit board and connected with the light emitting diode for driving the three-color LED chips to emit light. By use of a brightness adjustment switch on the instrument panel or the headlight switch, at least seven combinations of colors of light can be variably emitted to provide illuminating effect.

3 Claims, 5 Drawing Sheets

U S 6,819,056 B2

COLOR-CHANGING BULB OF INSTRUMENT PANEL OF A VEHICLE

BACKGROUND OF THE INVENTION

1. Technical Field

The present invention is related to a color-changing bulb of instrument panel of a vehicle. The color of the instrument panel can be easily changed simply by means of replacing the original bulb with the color-changing bulb without changing the structure of the instrument panel or the layout of the original circuit.

2. Description of the Prior Art

A car or a motorcycle is equipped with an instrument panel for showing the information of running of the car. This is quite important to a driver. FIG. 1 shows a conventional car-used instrument panel 1. The instrument panel is illuminated by various measures. For example, an electroluminescent board can be used as a light source for smoothly lightening the instrument panel. Still for example, Taiwanese Patent Publication No. 484239 discloses an illuminating device for vehicle-used meters. In the above illuminating device, multiple LED are arranged around the scales of the instrument panel for clearly showing important information of the running state of the vehicle.

Conventionally, multiple bulb seats 2 and multiple small bulbs 3 are disposed in the car-used meter 1 as the illuminating device. FIG. 2 is a circuit diagram of the conventional illuminating device. FIG. 3 is a perspective view of the bulb seat and small bulb of the conventional illuminating device mounted in the car-used instrument panel. The bulbs 3 are installed in the bulb seats 2 which are connected with a brightness adjuster 4. The brightness adjuster 4 is generally a variable resistor for adjusting the magnitude of the current passing through the small bulbs 3 so as to adjust the brightness of the bulbs 3.

When it is desired to change the color of light of the instrument panel, it is necessary to change the structure of the instrument panel or the layout of the circuit or add a different circuit to the instrument panel. This is quite inconvenient for a user to DIY modify the instrument panel of the car. Moreover, the original instrument panel design may be destructed to cause great loss.

SUMMARY OF THE INVENTION

It is therefore a primary object of the present invention to provide a color-changing bulb of instrument panel of a vehicle. The color of the instrument panel can be easily changed simply by means of replacing the original bulb with the color-changing bulb. Therefore, it is unnecessary to change the structure of the instrument panel of the vehicle or the layout of the original circuit thereof.

According to the above object, the color-changing bulb of the present invention is made as a bulb and directly installable in a bulb seat of the instrument panel. The color-changing bulb includes a bulb housing defining a receiving space for receiving a light emitting diode and a circuit board. The light emitting diode is composed of multicolor light emitting chips. A controlling circuit is disposed on the circuit board and connected with the light emitting diode for driving the multicolor light emitting chips to emit light with multiple combinations of colors and provide variable illuminating effect.

The controlling circuit includes: a stabilizing unit for picking up the power in the bulb seat to supply the controlling circuit with necessary power; a voltage sampling unit for picking up the varied voltage value adjusted by a brightness adjuster; and an analog/digital converting unit connected with the voltage sampling unit and the multicolor light emitting chips of the light emitting diode. The analog/digital converting unit serves to convert the varied voltage value adjusted by the brightness adjuster into digital signal for lightening the multicolor light emitting chips to create multiple combinations of colors of light.

Alternatively, the controlling circuit includes: a stabilizing unit for picking up the power in the bulb seat to supply the controlling circuit with necessary power; a pulse generating unit for generating a pulse signal; and a digital cycle outputting unit connected with the pulse generating unit and the multicolor light emitting chips of the light emitting diode. Via the pulse signal of the pulse generating unit, the digital cycle outputting unit generates a cycling digital signal output for lightening the multicolor light emitting chips of the light emitting diode so as to create a circularly varied multicolor illumination effect.

Still alternatively, the controlling circuit includes: a stabilizing unit for picking up the power in the bulb seat to supply the controlling circuit with necessary power; a memory unit for memorizing the number of times of switching of the headlight switch to generate a corresponding digital signal; and a digital cycle outputting unit connected with the memory unit and the multicolor light emitting chips of the light emitting diode. In accordance with the digital signal generated by the memory unit corresponding to the number of times of switching of the headlight switch, the digital cycle outputting unit outputs to lighten the multicolor light emitting chips of the light emitting diode to variably emit multiple colors of light.

The present invention can be best understood through the following description and accompanying drawings wherein:

DETAILED DESCRIPTION OF THE PREFERRED EMBODIMENTS

Figure 1:
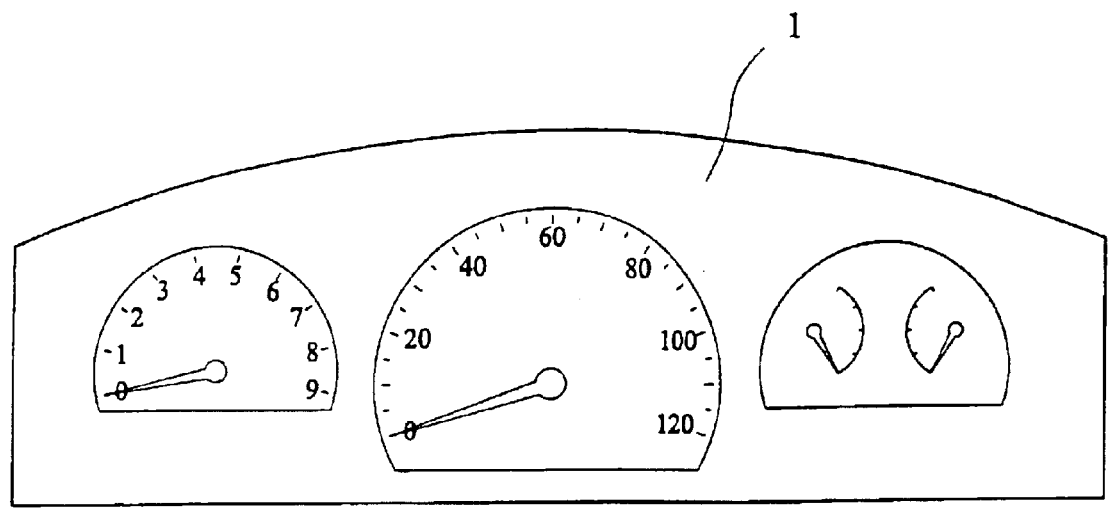
FIG. 1 shows a conventional instrument panel of a car.
Figure 2:
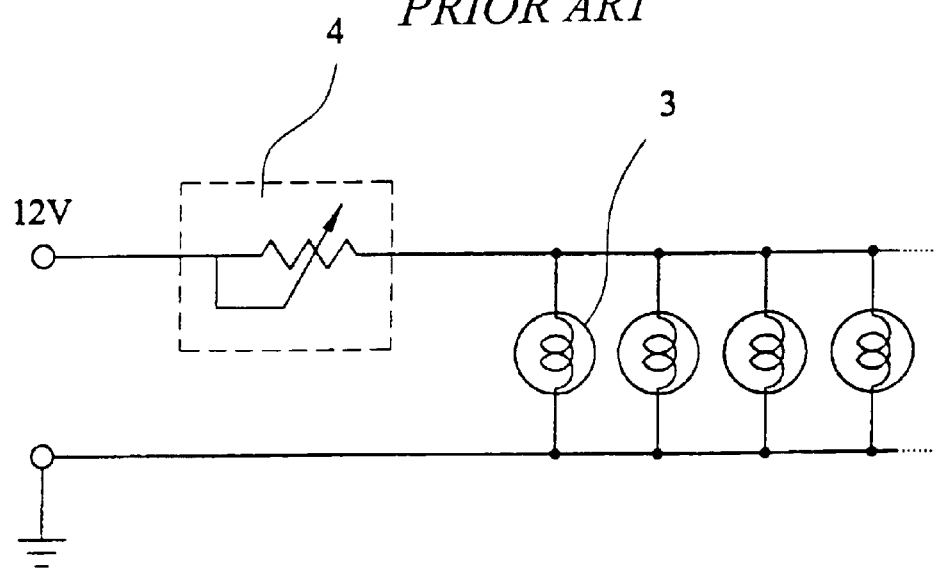
FIG. 2 is a circuit diagram of the illuminating device in the conventional instrument panel of a car.
Figure 3:
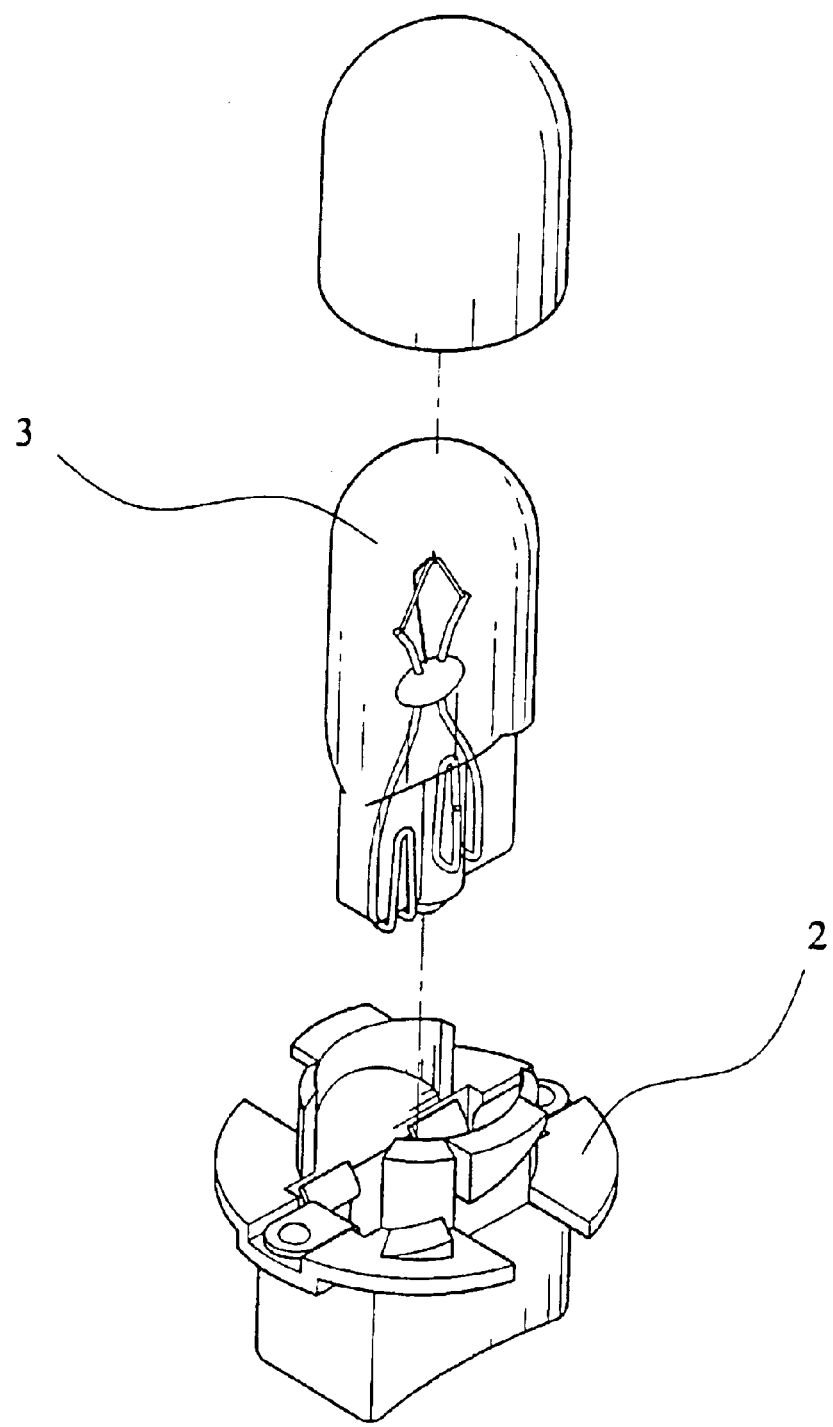
FIG. 3 is a perspective view showing the bulb seat and small bulb in the conventional instrument panel of a car.
Figure 4:
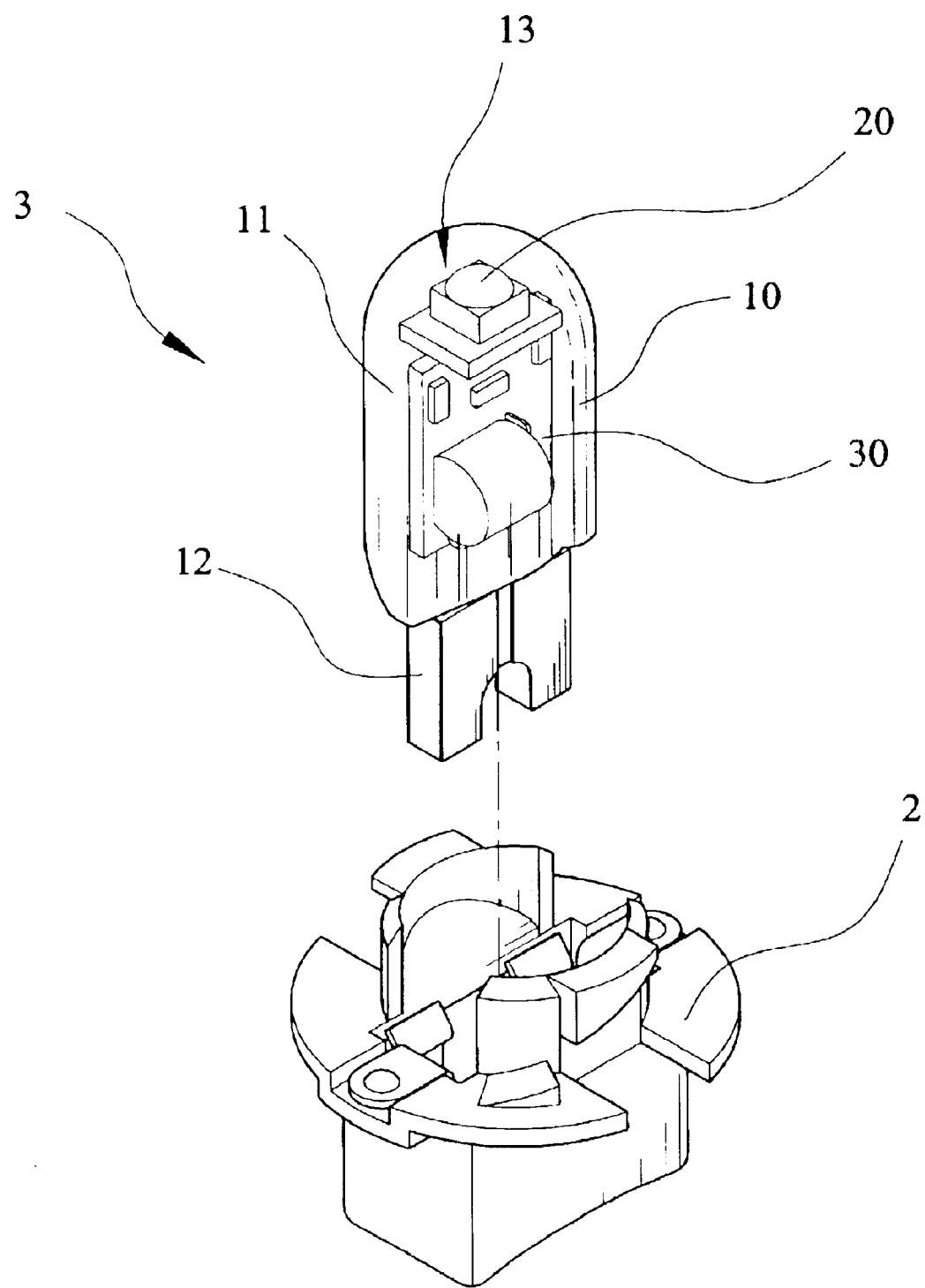
FIG. 4 is a perspective view of the color-changing bulb of the present invention.

Please refer to FIG. 4. The color-changing bulb 3 of the present invention is made as the small bulb used in the instrument panel. Accordingly, the color-changing bulb 3 can be seated on the bulb seat 2 in the instrument panel 1. The color-changing bulb 3 of the present invention is composed of a bulb housing 10, a light emitting diode 20 and a circuit board 30. The bulb housing 10 has a specification identical to that of a conventional small bulb. The upper section of the housing is a transparent cover 11. The housing defines a receiving space 13. The lower side of the housing is connected with a conductive seat 12 for mounting the housing 10 in the bulb seat 2 and electrically connecting with a power supply in the bulb seat 2.

The light emitting diode 20 is composed of LED chips 21 with red, green and blue colors. The circuit board 30 is disposed in the lower side of the receiving space 13 of the housing 10. The light emitting diode 20 is connected on the circuit board 30 and upward extends to the upper side of the receiving space 13 under the transparent cover 11. A controlling circuit on the circuit board 30 drives the three-color LED chips 21 of the light emitting diode 20 to emit light. The three-color LED chips 21 can create at least seven combinations of colors of light on the basis of the three original colors of white light, that is, red, green and blue light.

Figure 5:
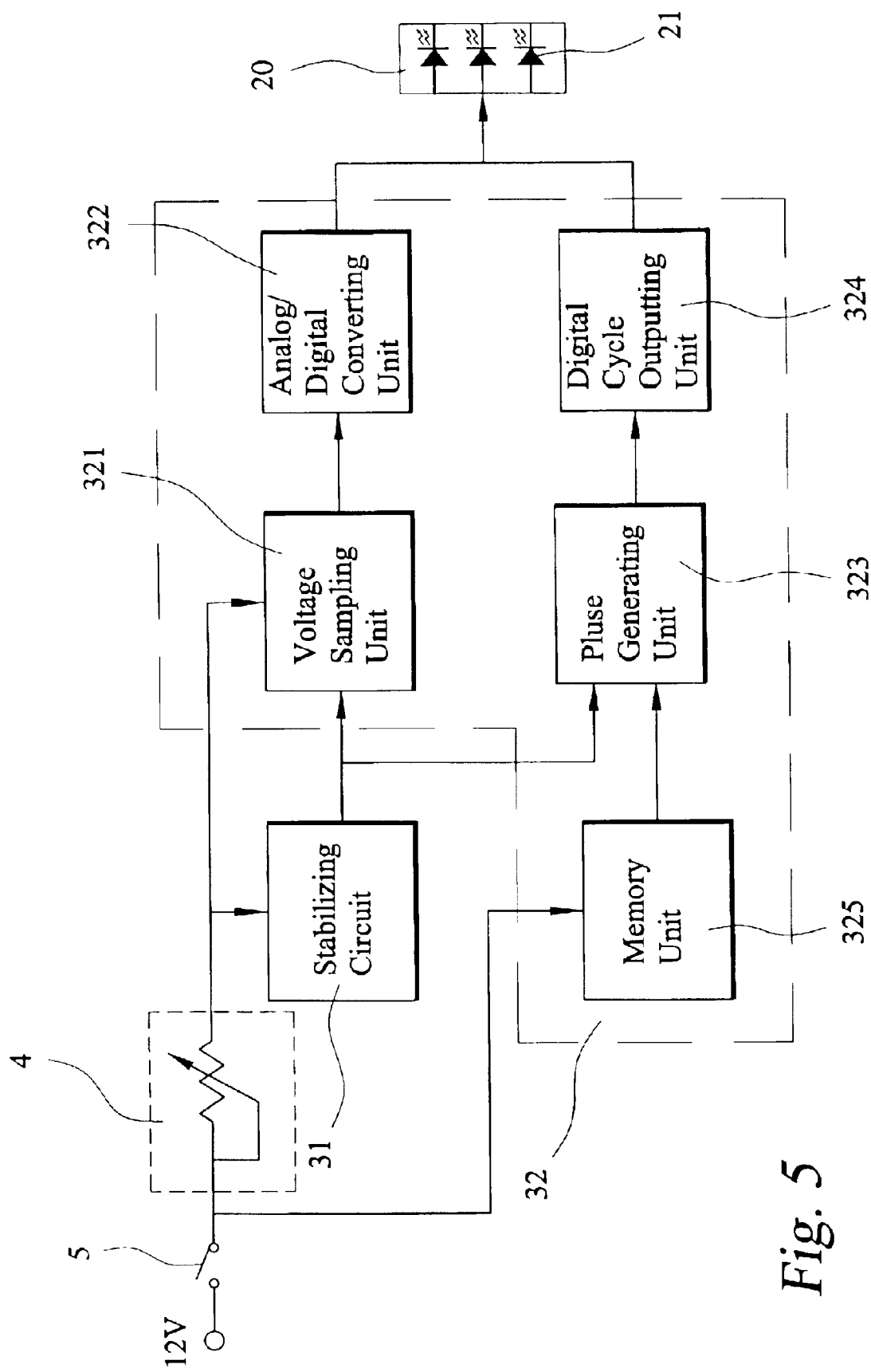
FIG. 5 is a block circuit diagram of the color-changing bulb of the present invention.
Figure 6:
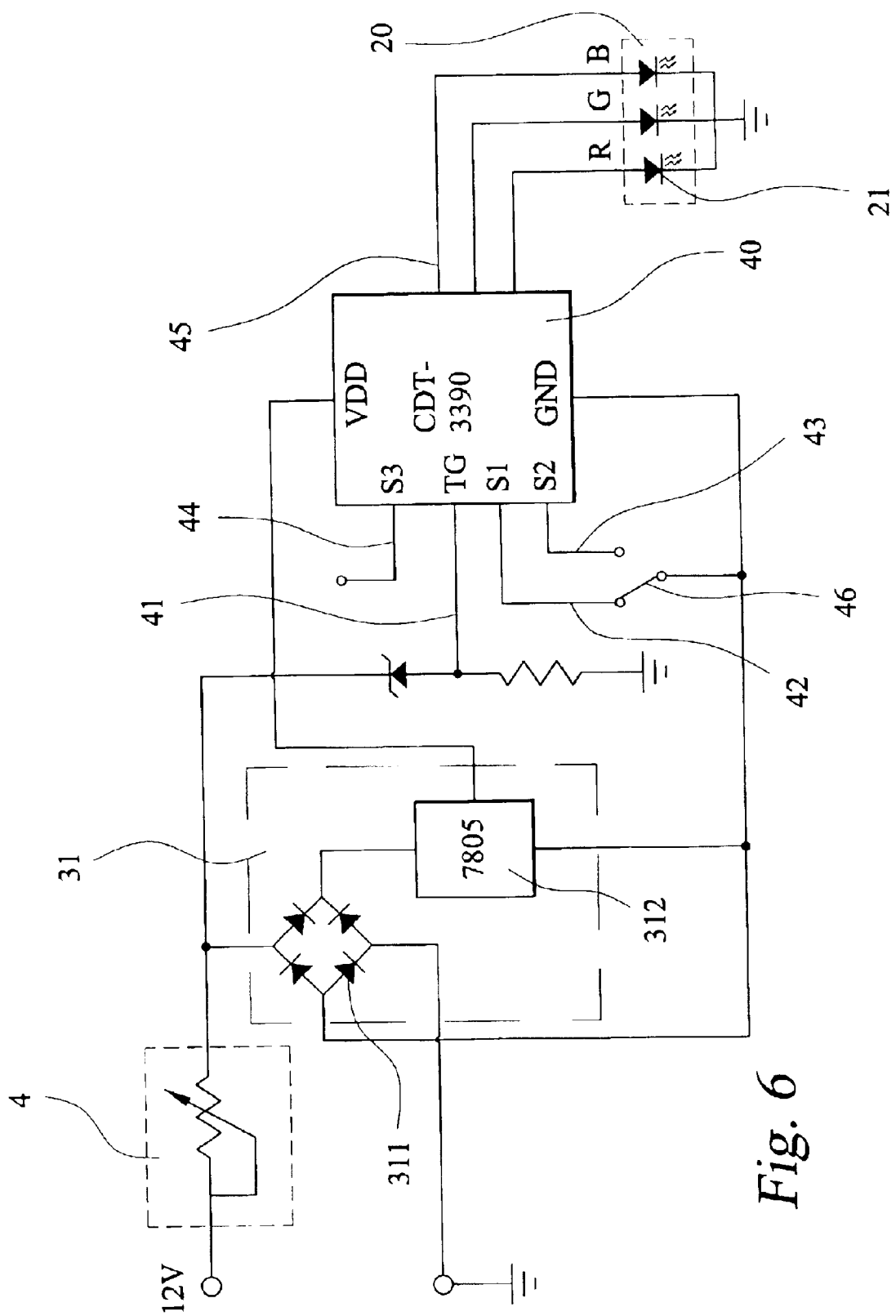
FIG. 6 is a circuit diagram of the color-changing bulb of the present invention.

FIG. 5 is a block circuit diagram of the color-changing bulb of the present invention and FIG. 6 is a circuit diagram of the color-changing bulb of the present invention. A stabilizing circuit 31 and a controlling circuit 32 are disposed on the circuit board 30. The stabilizing circuit 31 is connected with the brightness adjuster 4 and mainly composed of a bridge rectifier 311 and a stabilizing IC 312 for picking up the voltage of the brightness adjuster 4 to supply the controlling circuit 32 with the necessary power. In general, the small bulb 3 used in a car has no distinguishable positive and negative electrodes. However, the light emitting diode 20 has polarity. Therefore, in the present invention, a bridge rectifier 311 is arranged in front of the stabilizing IC 312 to eliminate the distinction between polarities.

The controlling circuit 32 is also connected to the brightness adjuster 4. The controlling circuit 32 is mainly composed of a voltage sampling unit 321, an analog/digital converting unit 322, a pulse generating unit 323 and a digital cycle outputting unit 324. The voltage sampling unit 321 picks up the varied voltage value adjusted by the brightness adjuster 4. In this embodiment, the voltage sampling unit 321 is composed of a 8V Zener diode and a biasing resistor. The brightness adjuster 4 inputs 12V voltage and the Zener diode fixes the voltage at 8V so that 0V~4V bias voltage value is obtained on the biasing resistor.

The analog/digital converting unit 322 has an input terminal connected with the voltage sampling unit 321 and three output terminals respectively connected with the three-color LED chips 21 of the light emitting diode 20. The analog/digital converting unit 322 serves to convert the 0V~4V bias voltage value adjusted by the brightness adjuster 4 into three-bit digital signal for lightening the three-color LED chips 21 to create at least seven combinations of colors of light. The seven combinations of colors except black color (000) are shown by Table 1 as follows:

| Three bits | combinations of colors |
| --- | --- |
| 001 | red |
| 011 | green, red (yellow) |
| 010 | green |
| 110 | blue, green (ultramarine) |
| 100 | blue |
| 101 | blue, red (orange) |
| 111 | blue, green, red (white) |

The pulse generating unit 323 serves to generate a pulse signal. The digital cycle outputting unit 324 is connected with the pulse generating unit 323 and has multiple output terminals respectively connected with the three-color LED chips 21 of the light emitting diode 20. Via the pulse signal of the pulse generating unit 323, the digital cycle outputting unit 324 generates a cycling digital signal output as the continuous cycle of Table 1 from 001 to 111 so as to lighten the three-color LED chips 21. Accordingly, present invention can create a circularly varied illumination effect as the colors of Table 1. The present invention can also drive the light emitting diode 20 by way of pulse wave, whereby each LED chip of the three-color LED chips 21 of the light emitting diode 20 can fully light, fully go out, gradually light or gradually go out. Therefore, the color can be variably shown in up to 255 manners.

Referring to FIG. 5, for some vehicles without any brightness adjuster on the instrument panel, such as motorcycles or trucks, the switch 5 of the headlight is used as a controlling measure for changing the color of the light of the light emitting diode 20. A memory unit 325 can be used to store the number of times of switching of the headlight switch so as to create the digital signal as the circular change from 1 to 7. The output terminal of the memory unit 325 is connected to the digital cycle outputting unit 324. Each time the headlight switch 1 is switched, the digital signal is varied once according to the combinations of colors of Table 1. Accordingly, in accordance with the digital signal, the digital cycle outputting unit 324 can output to lighten the three-color LED chips 21 of the light emitting diode 20 to variably emit multiple colors of light.

In order to reduce the volume of the present invention and accommodate the present invention in the bulb housing 10, the controlling circuit 32 is made as an IC 40 including a voltage signal input terminal 41, a fixed mode signal input terminal 42, a cycle mode signal input terminal 43, a flickering mode signal input terminal 44 and three output terminals 45 respectively connected with the three-color LED chips 21 of the light emitting diode 20. The voltage signal input terminal 41 is connected with the brightness adjuster 4. The fixed mode signal input terminal 42 and the cycle mode signal input terminal 43 are connected with a mode selection switch 46 for switching the color-changing modes of the light emitting diode 20. According to the adjustment of the brightness adjuster 4, the color of the light can be varied. Alternatively, the multiple combinations of colors can be circularly variably created.

The flickering mode signal input terminal 44 of the IC 40 can be connected with the speedometer of the instrument panel 1 for detecting the speedometer. In case the speed of the vehicle exceeds a preset speed (such as 100 km/h), the light emitting diode 20 is driven to emit a flickering light to inform a driver of speeding. Therefore, the driver is warned to slow down and the accident can be avoided. Alternatively, the flickering mode signal input terminal 44 can be connected to a thermosensor, oil gauge or any other inspection device to extra warn a user.

The above embodiments are only used to illustrate the present invention, not intended to limit the scope thereof. Many modifications of the above embodiments can be made without departing from the spirit of the present invention.

What is claimed is:

1. A color-changing bulb for an instrument panel of a vehicle, which is installable in a bulb seat of the instrument panel, the color-changing bulb comprising:

a bulb housing having a transparent cover on upper side and defining a receiving space, a lower side of the housing being connected with a conductive seat, the bulb housing being mountable in the bulb seat with the conductive seat electrically connected with a power supply in the bulb seat;

a light emitting diode including multicolor light emitting chips and positioned in the receiving space of the bulb housing; and, a circuit board positioned in the receiving space of the bulb housing, a controlling circuit being disposed on the circuit board and connected with the light emitting diode for driving the multicolor light emitting chips of the light emitting diode to create multiple combinations of colors of light;

wherein the controlling circuit on the circuit board is connected to a brightness adjuster, the controlling circuit including:
- a voltage sampling unit for picking up the varied voltage value adjusted by the brightness adjuster; and
- an analog/digital converting unit having an analog input terminal connected with the voltage sampling unit and having multiple output terminals respectively connected with the multicolor light emitting chips of the light emitting diode, the analog/digital converting unit serving to convert the varied voltage value adjusted by the brightness adjuster into multi-bit digital signal for actuating the multicolor light emitting chips to create multiple combinations of colors of light.

2. A color-changing bulb for an instrument panel of a vehicle, which is installable in a bulb sent of the instrument panel, the color-changing bulb comprising:

a bulb housing having a transparent cover on upper side and defining a receiving space, a lower side of the housing being connected with a conductive seat, the bulb housing being mountable in the bulb seat with the conductive seat electrically connected with a power supply in the bulb seat;

a light emitting diode including multicolor light emitting chips and positioned in the receiving space of the bulb housing; and, a circuit board positioned in the receiving space of the bulb housing, a controlling circuit bring disposed on the circuit board and connected with the light emitting diode for driving the multicolor light emitting chips of the light emitting diode to create multiple combinations of colors of light;

wherein the controlling circuit on the circuit board includes:
- a stabilizing unit for picking up the power in the bulb seat to supply the controlling circuit with necessary power;
- a pulse generating unit for generating a pulse signal; and
- a digital cycle outputting unit connected with the pulse generating unit and having multiple output terminals respectively connected with the multicolor light emitting chips of the light emitting diode, via the pulse signal of the pulse generating unit, the digital cycle outputting unit generating a cycling digital signal output for actuating the multicolor light emitting chips of the light emitting diode so as to create a circularly varied multicolor illumination effect.

3. A color-changing bulb for an instrument panel of a vehicle, which is installable in a bulb seat of the instrument panel, the color-changing bulb comprising:

a bulb housing having a transparent cover on upper side and defining a receiving space, a lower side of the housing being connected with a conductive seat, the bulb housing being mountable in the bulb seat with the conductive seat electrically connected with a power supply in the bulb seat;

a light emitting diode including multicolor light emitting chips and positioned in the receiving space of the bulb housing; and, a circuit board positioned in the receiving space of the bulb housing, a controlling circuit being disposed on the circuit board and connected with the light emitting diode for driving the multicolor light emitting chips of the light emitting diode to create multiple combinations of colors of light;

wherein the controlling circuit on the circuit board is electrically connected to a headlight switch, the controlling circuit including:
- a stabilizing unit for picking up the power in the bulb seat to supply the controlling circuit with necessary power;
- a memory unit for memorizing the number of times of switching of the headlight switch to generate a corresponding digital signal; and
- a digital cycle outputting unit connected with the memory unit and having multiple output terminals respectively connected with the multicolor light emitting chips of the light emitting diode, in accordance with the digital signal generated by the memory unit corresponding to the number of times of switching of the headlight switch, the digital cycle outputting unit outputs to lighten the multicolor light emitting chips of the light emitting diode to variably emit multiple colors of light.

* * * * *